United States Patent [19]
Latta

[11] 3,815,391
[45] June 11, 1974

[54] AUTOMOBILE ANTI-THEFT DEVICE

[76] Inventor: Lee M. Latta, 1922 Rodeo Rd., Los Angeles, Calif. 90018

[22] Filed: Apr. 23, 1973

[21] Appl. No.: 353,381

[52] U.S. Cl. ................ 70/209, 16/122, 24/115 A, 24/116 R, 59/78, 119/136, 231/4, 403/284
[51] Int. Cl. ............................................ B60r 25/02
[58] Field of Search ............ 16/122, 216; 24/115 A, 24/116 R, 116 A, 265 CC; 59/78; 70/18, 209, 457; 119/109, 136, 137, 138, 153; 231/4, 5; 403/284

[56] References Cited
UNITED STATES PATENTS

| | | | |
|---|---|---|---|
| 646,823 | 4/1900 | Gavin | 16/122 |
| 1,347,463 | 7/1920 | Jameson | 70/211 |
| 1,429,334 | 9/1922 | Furber | 70/209 |
| 1,448,658 | 3/1923 | Furber | 70/209 |
| 1,481,537 | 1/1924 | Carney | 70/18 |
| 2,621,385 | 12/1952 | Gilmore | 403/284 |
| 3,531,955 | 10/1970 | Taylor et al. | 70/59 |

*Primary Examiner*—Albert G. Craig, Jr.

[57] ABSTRACT

A metal tube has a length of chain secured within and a portion extending outwardly. The metal tube is initially located adjacent the steering wheel and allowed to hang downwardly. The chain is knotted about a radially extending crossbar of the steering wheel with the remaining portion of the chain being wrapped about another crossbar and locked in place. On attempting to turn the steering wheel with the anti-theft device in place, the metal tube will obstruct against the seat, dashboard, gear shift lever, handbrake, or other part of the vehicle.

8 Claims, 3 Drawing Figures

PATENTED JUN 11 1974 3,815,391
FIG. 1.
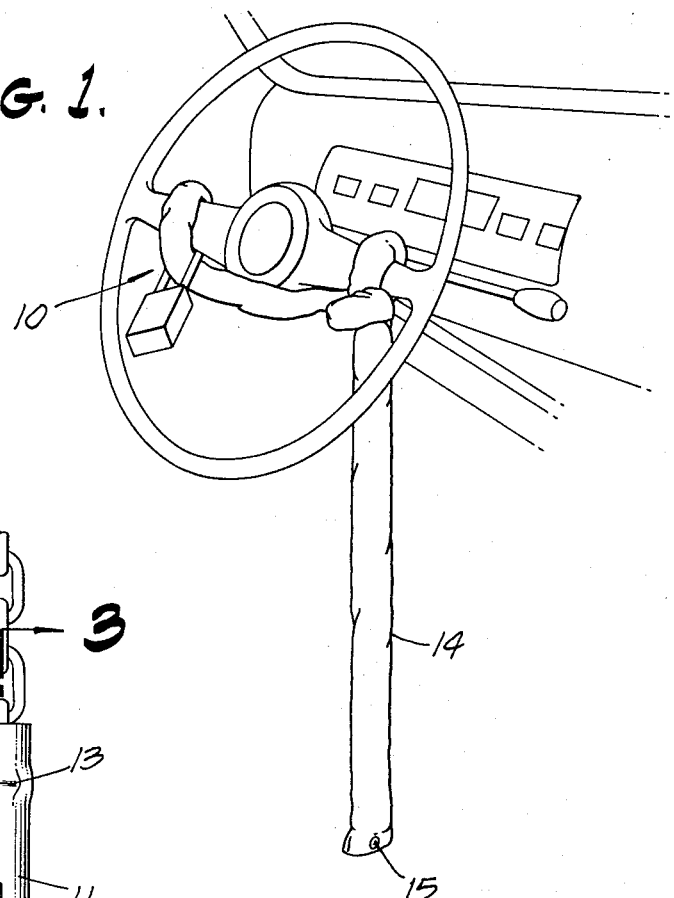
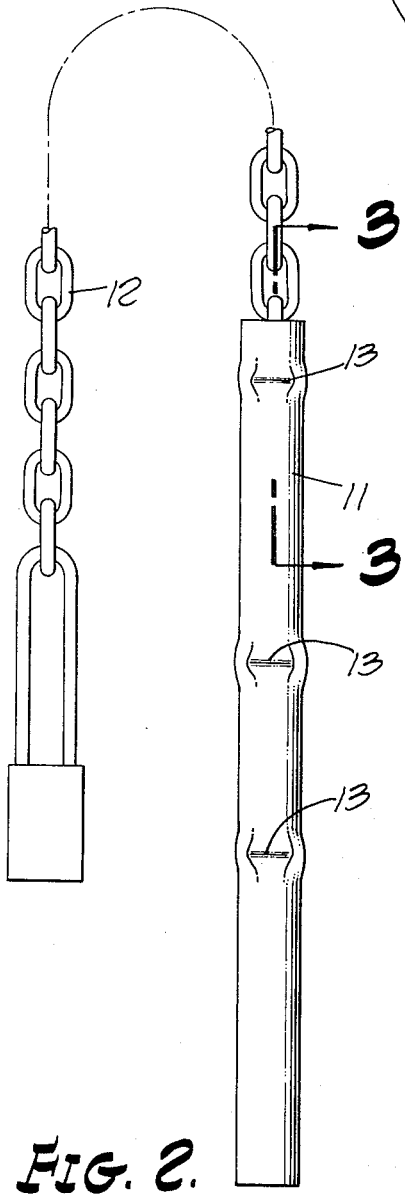
FIG. 2.
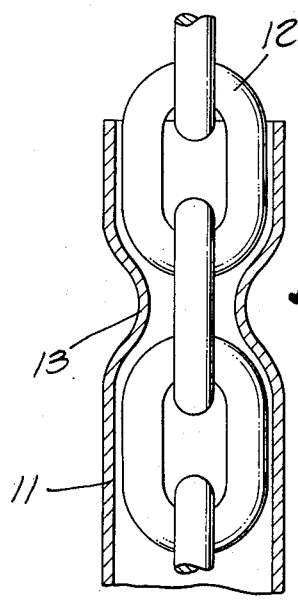
FIG. 3.

AUTOMOBILE ANTI-THEFT DEVICE

The present invention relates generally to a device for preventing theft or unauthorized use of an automobile, truck or the like, and, more particularly, to such an antitheft device which limits rotation of the automobile steering wheel when operatively related to the automobile.

BACKGROUND OF THE INVENTION

An ever increasing problem, particularly in urban areas, is that of car theft, and its more minor form sometimes referred to as "joy-riding." There have been many approaches in the past to prevent unauthorized use of a vehicle by use of such things as special locking means on the doors, electrical and electronic apparatus which would prevent starting the engine without a key, and various alarm devices such as a siren or operation of the horn in the event that the auto is used by other than someone having the ignition key. Still other apparatus consists simply of a chain interconnecting the steering wheel with, say, the brake pedal. However, all of these various approaches to preventing unauthorized use of an automobile have been found unsatisfactory for one or more reasons. Either the protective apparatus is relatively expensive, such as certain of the electronic and electrical apparatus, or they are easily circumvented. Also, in some cases, the apparatus used has been unreliable and tended, on occasion, to malfunction in a manner identifying the true owner as an unauthorized intruder.

Furthermore, in many of the techniques used in the past, the apparatus for protecting the automobile was hidden from sight so that even if it worked properly, causing the would-be intruder to be thwarted or frightening him off, the automobile had already been damaged to some extent. It has been found desirable that automobile anti-theft apparatus should be clearly visible to anyone having intentions of stealing the auto so that they would be deterred by this knowledge from even attempting to tamper with the auto. That is, car thieves will usually not knowingly try to steal a car which is protected, unless it is protected by a device which they can readily circumvent, since it is much easier for them to merely search around for an automobile which does not have protective apparatus.

OBJECTS AND SUMMARY OF THE INVENTION

It is, therefore, a primary aim and object of this invention to provide a device for disabling an automobile which is readily operatively connected to and dismantled from the automobile.

A further object of the invention is the provision of a device for preventing unauthorized use of an automotive vehicle which restricts angular movement of the vehicle steering wheel to such an extent that the vehicle cannot be properly driven.

Another object of the invention is the provision of an automobile anti-theft device which is reliable, inexpensive to manufacture, simple to use and readily visible to any would-be thief from the outside of the automobile.

In the practice of the present invention, a metal tube has a length of chain secured therewithin and a portion thereof extending outwardly. The tube and outwardly extending chain portion are covered by a suitable material, e.g., plastic, to prevent marring of the automobile interior surfaces.

In use, the metal tube is located immediately adjacent the steering wheel and allowed to hang downwardly. The chain is then knotted about an immediately adjacent radially extending crossbar of the steering wheel. The remaining end portion of the chain is then wrapped about another radial crossbar and secured in place by a lock. Preferably the lock should be a magnetic lock, or other type of lock that cannot be easily picked.

On attempting to turn the steering wheel with the anti-theft device of this invention in place as described, it will be found that the metal tube will either be caught against the seat, the dashboard, the gear shift lever, handbrake, hump in the central part of the auto which accommodates the power train, or other part of the auto interior. In this way the steering wheel is impeded from rotating beyond a very limited angular extent, thereby denying effective use of the vehicle until the device is removed.

DESCRIPTION OF THE DRAWINGS

FIG. 1 is a perspective view of a typical automobile steering wheel and dashboard, showing the device of the subject invention mounted in operative relation.

FIG. 2 is a perspective view of the device of the subject invention shown in extended form.

FIG. 3 is a sectional view, taken through a portion of the metal tube along line 3—3 of FIG. 2.

DESCRIPTION OF A PREFERRED EMBODIMENT

With reference now to the drawings and particularly FIG. 2, the subject invention 10 is seen to comprise in its major elements an open-ended, hollow metal tube 11 and a metal chain 12 received within the tube and having a portion thereof extending upwardly from one end of the tube. The chain is secured within the tube by parts of the tube wall being compressed inwardly clampingly engaging the chain as at 13.

A sleeve 14, constructed of a fabric or plastic material is received over the tube and chain to protect the finish of various parts of the automobile which the device 10 may contact when in use. Specifically, the plastic cover is received completely onto the tube 11 with one end thereof closed over the tube end as by snaps 15, for example, and of such dimensions as to leave an end portion of the chain extending outwardly therefrom.

The tube 11 may be constructed of any suitable metal, although for economy and ease of manufacture, aluminum has been found preferable. In a practicable construction of the invention, the tube 11 was made of cylindrical aluminum tubing thirty-six (36) inches long and having an outer diameter of 1¼ inches.

The chain 12 is preferably constructed of a very hard material, such as case-hardened steel, in order to prevent its being easily removed, cut or broken. As an alternative, due to the relatively high expense of case-hardened chain, the portion of the chain that extends within the tube may be made of a softer steel or iron; however, that part of the chain extending outwardly of the tube should be constructed of a harder material to prevent severing by a thief.

In operation, as shown in FIG. 1, the tube 11 is oriented vertically under one side of the steering wheel and is of such a length as to extend substantially from the middle of the steering wheel to the floor of the automobile. The chain 12 is knotted about one of the radially extending arms 16 of the steering wheel. Next, the free end of the chain is looped or tied about another steering wheel radial arm 17 and secured thereto by a lock 18.

On attempting to turn the wheel with the described device in place, it will be found that the tube 11 is of such a length as to engage some part of the automobile and prevent wheel rotation. For example, the tubing may engage the floor itself, or, on counter-clockwise motion, it may engage the hump in the center of the floor which accommodates the power train. Still further, if the auto is of such a size as not to prevent rotation for the first stated reasons, it will be found that the tube will encounter the handbrake, shift lever, or dashboard of the vehicle.

If a would-be thief attempts to remove the device to thwart its operation, it is to be particularly noted that both crossarms would have to be broken or cut through in order to slip off the device. Of course, severing two crossarms would make the steering wheel completely inoperative. Moreover, since the chain is case-hardened, it would take rather large and complicated equipment to either saw or break through the chain. Still further, since the chain extends throughout most of the tube, the tube cannot merely be sawed through without also either cutting or breaking the chain.

Any lock may be used with this invention; however, considering the generally acknowledged ability of car thieves to "pick" locks it is advisable to use a lock that cannot be picked. For example, a so-called combination lock is excellent for this purpose. A further preferred form of lock is a magnetic lock which is opened by merely placing a specially coded magnetic key in contact with the lock body.

Not only is the subject invention difficult to circumvent by a would-be thief, but by the location of the device in use it is readily apparent to anyone passing near the auto that a protective means is being used. That is, the would-be thief could very probably tell by looking through the automobile windows how the device worked and how difficult it would be to disable it. In this manner, the invention deters car thieves by discouraging them at the outset, thereby preventing even the relatively small damage usually associated with attempted theft, e.g., broken side windows.

Although the subject invention has been specifically described herein in relation to an automobile, it is not intended to limit application in that regard. For example, it is considered within the spirit of this invention that the described apparatus could be equally advantageous for any automotive vehicle having a steering wheel, such as a truck, camper, dune buggy or the like.

What is claimed is:

1. Apparatus for preventing operation of an automotive vehicle having a steering wheel with at least a pair of radially extending crossarms, comprising:
    an elongated rigid member;
    flexible hard metal means connected to said rigid member, said means being looped about one of the steering wheel crossarms and secured to the other crossarm, whereby rotation of the steering wheel beyond a certain limited angular extent produces obstruction of the elongated member with parts of the automobile interior.

2. Apparatus as in claim 1, in which the elongated member includes a hollow metal tube.

3. Apparatus as in claim 1, in which the resilient hard metal means includes a link chain constructed of case-hardened steel.

4. Apparatus as in claim 1, in which said flexible means is secured to the second crossarm by a lock.

5. Apparatus for preventing the use of an automotive vehicle having a steering wheel, comprising:
    a metal link chain;
    a length of hollow metal tubing; and
    means securing the link chain within said tubing with a portion of the chain extending outwardly thereof;

said link chain being secured to one part of the steering wheel and knotted about another in such manner as to allow the metal tubing to hang downwardly from the steering wheel in obstructing relation to parts of the automobile adjacent the steering wheel on wheel rotation.

6. Apparatus as in claim 5, in which said means for securing the chain within the tubing includes deforming the tubing wall to clampingly engage the chain contained therewithin.

7. Apparatus as in claim 5, in which the link chain is constructed of hardened steel.

8. Apparatus as in claim 5, in which said metal tubing is at least 18 inches long.

* * * * *